United States Patent
Okamoto (10) Patent No.: US 9,109,691 B2
(45) Date of Patent: Aug. 18, 2015

(54) GEAR

(71) Applicant: Shinichirou Okamoto, Kawaguchi (JP)

(72) Inventor: Shinichirou Okamoto, Kawaguchi (JP)

(73) Assignee: ENPLAS CORPORATION, Saitama (JP)

(*) Notice: Subject to any disclaimer, the term of this patent is extended or adjusted under 35 U.S.C. 154(b) by 354 days.

(21) Appl. No.: 13/749,465

(22) Filed: Jan. 24, 2013

(65) Prior Publication Data
US 2013/0186225 A1    Jul. 25, 2013

Related U.S. Application Data

(62) Division of application No. 12/592,625, filed on Nov. 30, 2009, now Pat. No. 8,381,608.

(30) Foreign Application Priority Data

Nov. 28, 2008 (JP) ................ 2008-304621
May 7, 2009 (JP) ................ 2009-112531

(51) Int. Cl.
*F16H 55/08* (2006.01)

(52) U.S. Cl.
CPC .... *F16H 55/0806* (2013.01); *F16H 2055/0893* (2013.01); *Y10T 74/19949* (2015.01); *Y10T 74/19963* (2015.01); *Y10T 74/19972* (2015.01)

(58) Field of Classification Search
CPC ................ F16H 55/0806; F16H 2055/0893
See application file for complete search history.

(56) References Cited

U.S. PATENT DOCUMENTS

| | | | |
|---|---|---|---|
| 4,051,745 A | 10/1977 | Ishikawa | |
| 7,178,420 B2 | 2/2007 | Barth | |
| 8,100,028 B2 | 1/2012 | Miyaoku et al. | |
| 2015/0059523 A1* | 3/2015 | Lieder et al. ............... | 74/665 F |

FOREIGN PATENT DOCUMENTS

JP     2004-519644 A     7/2004

* cited by examiner

*Primary Examiner* — William Kelleher
*Assistant Examiner* — Terence Boes
(74) *Attorney, Agent, or Firm* — DLA Piper LLP (US)

(57) ABSTRACT

A gear having a tooth form shape including, on a tooth root side of a tooth, a first curved surface connected to a tooth face of an involute tooth form and convex in a direction opposite to the tooth face, a flat surface connected to the first curved surface, and a second curved surface connected to the flat surface and convex in the same direction as the first curved surface. In a normal plane, the shape of the flat surface is a tangent in contact with a tip side end of a trajectory of motion of a tooth of a meshing partner gear and intersecting with a tooth form center line at a 30° angle, the shape of the first curved surface is circular arcs in contact with the tangent, and, the shape of the second curved surface is circular arcs in contact with the tooth face and the tangent.

5 Claims, 13 Drawing Sheets

GEAR

CROSS-REFERENCE TO RELATED APPLICATIONS

This is a Divisional Application of application Ser. No. 12/592,625 of Nov. 30, 2009 which is incorporated herein in its entirety by reference.

BACKGROUND OF THE INVENTION

1. Field of the Invention

The present invention relates to a gear widely used in a power transmission mechanism of automobiles, precision machineries, industrial machineries, components used therein, and the like.

2. Description of the Related Art

Various modifications have been made to enhance tooth strength in gears used in power transmission mechanisms of automobiles, precision machineries, and the like.

Figure 19:
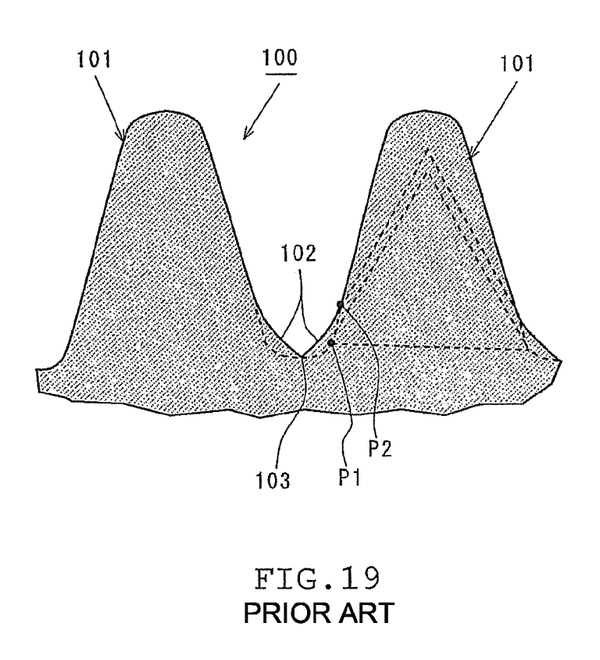
FIG. 19 is a normal plane view of a tooth of a conventional gear.

FIG. 19 is a diagram of a tooth form shape of such a gear 100. In the gear 100 shown in FIG. 19, the shape of a tooth 101 on the bottom side is an arch-shaped curved surface 102 matching a trajectory of motion of a tooth of a meshing partner gear (pinion) to an extent in which the arch-shaped curved surface 102 does not interfere with the trajectory. Tooth strength is enhanced by the position of a critical section in a 30° tangent method being moved closer to the top side, from P1 to P2 (refer to Patent Literature 1).

Patent Literature 1: Japanese Patent Laid-open Publication No. 2004-519644

However, in the gear 100 shown in FIG. 19, the arch-shaped curved surfaces 102 and 102 of adjacent teeth 101 and 101 merge, forming a pointed triangular peak 103 at the bottom. Therefore, in the gear 100 shown in FIG. 19, stress tends to be concentrated at the peak 103 at the bottom. There is a demand for strength enhancement of the overall tooth 101 including the bottom.

SUMMARY OF THE INVENTION

The present invention has been proposed to meet such a demand. An object of the present invention is to provide a gear having a tooth form shape in which stress concentration on the tooth root side including the bottom does not easily occur and strength of the tooth can be enhanced.

As shown in FIG. 1 to FIG. 6, an invention according to a first aspect relates to a gear 1 having a distinct tooth form shape. In other words, in the invention, (1) a first curved surface 4 smoothly connected to a tooth face 3 of an involute tooth form A and convex in a direction opposite to the tooth face 3, (2) a flat surface 5 connected to the first curved surface 4, and (3) a second curved surface 6 smoothly connected to the flat surface 5 and convex in the same direction as the first curved surface 4 are formed on a tooth root side of a tooth 2. The shape of the flat surface 5 in a normal plane thereof is a tangential line 8 in contact with a tip side end of a trajectory of motion B of a tooth of a meshing partner gear and intersecting with a tooth form center line 7 at a 30° angle when an end of the flat surface 5 on the first curved surface 4 side is extended. The shape of the second curved surface 6 in a normal plane thereof is a circular arc shape formed by a circular arc in contact with the tooth face 3 and a root circle 10 of the involute tooth form A, and having a maximum curvature radius R1 among circular arcs not interfering with the trajectory of motion B of the tooth of the meshing partner gear, the circular arc being moved along a tooth space center line 9 to a position in contact with the tangential line 8. The shape of the first curved surface 4 in a normal plane thereof is a circular arc shape in contact with the tooth face 3 and the tangential line 8, and having a maximum curvature radius R2 among circular arcs that do not interfere with the trajectory of motion B of the tooth of the meshing partner gear.

Figure 7:
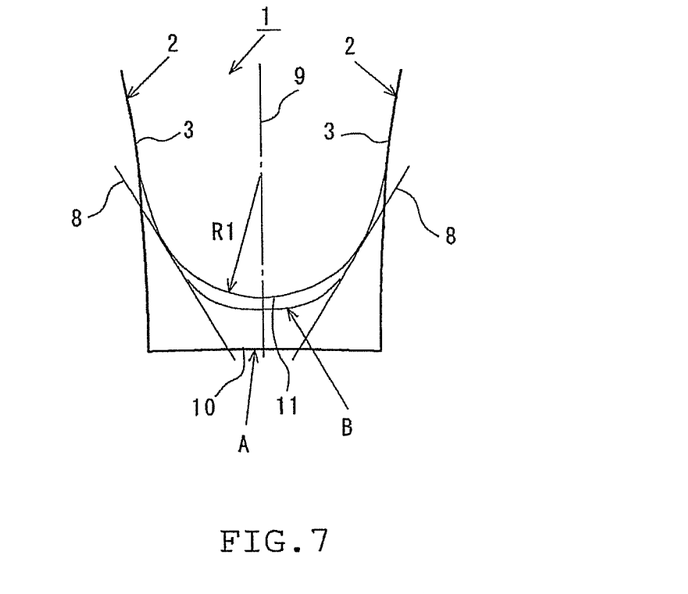
FIG. 7 is a partially enlarged view of a normal plane showing a first formation process for a tooth form shape in a first variation example according to the first embodiment.
Figure 8:
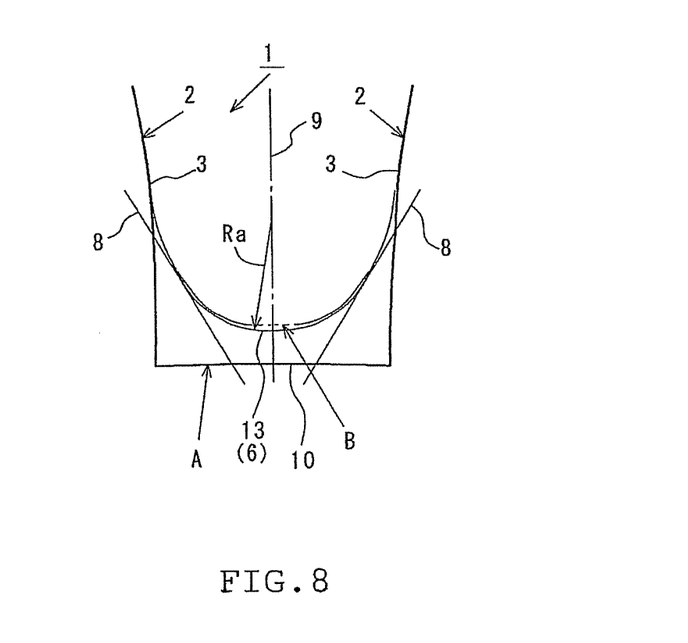
FIG. 8 is a partially enlarged view of a normal plane showing a second formation process for the tooth form shape in the first variation example according to the first embodiment.
Figure 9:
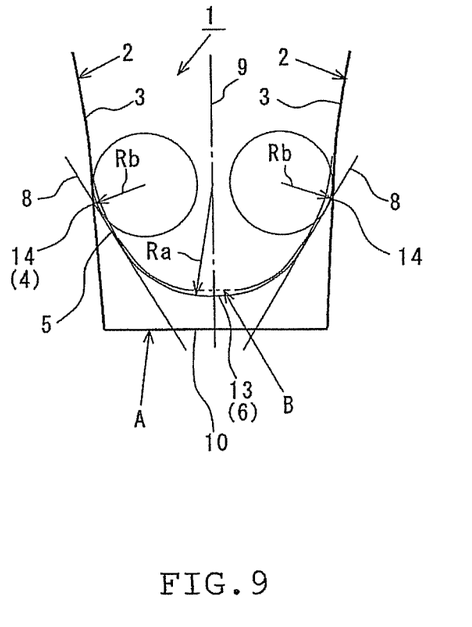
FIG. 9 is a partially enlarged view of a normal plane showing a third formation process for the tooth form shape in the first variation example according to the first embodiment.

As shown in FIG. 7 to FIG. 9, an invention according to a second aspect relates to a gear 1 having a distinct tooth form shape. In other words, in the invention, (1) a first curved surface 4 smoothly connected to a tooth face 3 of an involute tooth form A and convex in a direction opposite to the tooth face 3, (2) a flat surface 5 connected to the first curved surface 4, and (3) a second curved surface 6 smoothly connected to the flat surface 5 and convex in the same direction as the first curved surface 4 are formed on a tooth root side of a tooth 2. The shape of the flat surface 5 in a normal plane thereof is a tangential line 8 in contact with a tip side end of a trajectory of motion B of a tooth of a meshing partner gear and intersecting with a tooth form center line 7 at a 30° angle when an end of the flat surface 5 on the first curved surface 4 side is extended. The shape of the second curved surface 6 in a normal plane thereof is a circular arc shape in contact with the tangential line 8 and having a maximum curvature radius Ra among circular arcs not interfering with the trajectory of motion B of the tooth of the meshing partner gear. The shape of the first curved surface 4 in a normal plane thereof is a circular arc shape in contact with the tooth face 3 and the tangential line 8, and having a maximum curvature radius Rb among circular arcs not interfering with the trajectory of motion B of the tooth of the meshing partner gear.

An invention according to third aspect is a variation example of the second curved surface 6 in the invention according to the second aspect. In other words, in the invention, the shape of the second curved surface 6 in a normal plane thereof is a circular arc shape formed by a circular arc in contact with both opposing tooth faces 3 and 3 of adjacent teeth 2 and 2 and a root circle 10 of the involute tooth form A, and having a maximum curvature radius among circular arcs not interfering with the trajectory of motion B of the tooth of the meshing partner gear, the circular arc being moved along a tooth space center line 9 to a position in contact with the tangential line 8.

As shown in FIG. 10 to FIG. 15, an invention according to a fourth aspect relates to a gear 1 having a distinct tooth form shape. In other words, in the invention, (1) a first curved surface 4 smoothly connected to a tooth face 3 of an involute tooth form A and convex in a direction opposite to the tooth face 3, (2) a flat surface 5 connected to the first curved surface 4, and (3) a second curved surface 6 smoothly connected to the flat surface 5 and convex in the same direction as the first curved surface 4 are formed on a tooth root side of a tooth 2. The shape of the flat surface 5 in a normal plane thereof is a tangential line 8 in contact with a tip side end of a trajectory of motion B of a tooth of a meshing partner gear and intersecting with a tooth form center line 7 at a 30° angle when an end of the flat surface 5 on the first curved surface 4 side is extended. The shape of the second curved surface 6 in a normal plane thereof is a circular arc shape formed by a circular arc in contact with the tooth face 3 and a root circle 10 of the involute tooth for A, and having a maximum curvature radius R1' among circular arcs not interfering with the trajectory of motion B of the tooth of the meshing partner gear, the circular arc being moved to a position in contact with the tangential line 8 and the root circle 10. The shape of the first curved surface 4 in a normal plane thereof is a circular arc shape in contact with the tooth face 3 and the tangential line 8, and having a maximum curvature radius R2' among circular arcs of a size not interfering with the trajectory of motion B of the tooth of the meshing partner gear.

Figure 16:
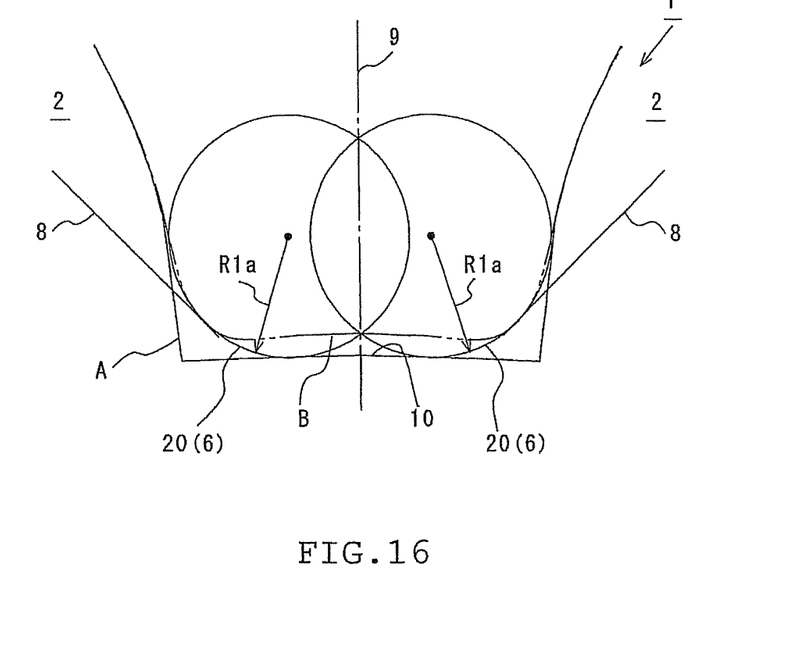
FIG. 16 is a partially enlarged view of a normal plane showing a second formation process for a tooth form shape in a fourth variation example according to the first embodiment.
Figure 17:
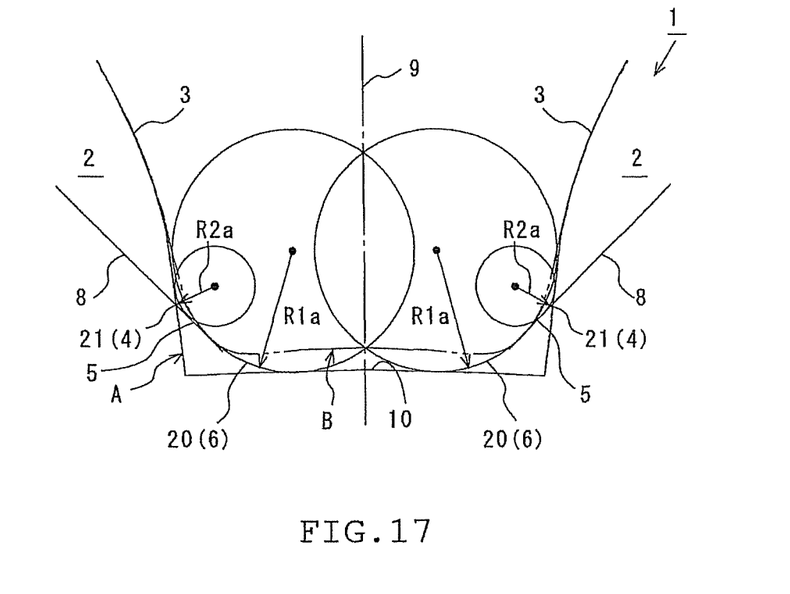
FIG. 17 is a partially enlarged view of a normal plane showing a third formation process for the tooth form shape in the fourth variation example according to the first embodiment.

As shown in FIG. 16 and FIG. 17, an invention according to a fifth aspect relates to a gear 1 having a distinct tooth form shape. In other words, in the invention, (1) a first curved surface 4 smoothly connected to a tooth face 3 of an involute tooth form A and convex in a direction opposite to the tooth face 3, (2) a flat surface 5 connected to the first curved surface 4, and (3) a second curved surface 6 smoothly connected to the flat surface 5 and convex in the same direction as the first curved surface 4 are formed on a tooth root side of a tooth 2. The shape of the flat surface 5 in a normal plane thereof is a tangential line 8 in contact with a tip side end of a trajectory of motion B of a tooth of a meshing partner gear and intersecting with a tooth form center line 7 at a 30° angle when an end of the flat surface 5 on the first curved surface 4 side is extended. The shape of the second curved surface 6 in a normal plane thereof is a circular arc shape in contact with the tangential line 8 and a root circle 10 of the involute tooth form A, and having a maximum curvature radius R1$a$ among circular arcs not interfering with the trajectory of motion B of the tooth of the meshing partner gear. The shape of the first curved surface 4 in a normal plane thereof is a circular arc shape in contact with the tooth face 3 and the tangential line 8, and having a maximum curvature radius R2$a$ among circular arcs of a size not interfering with the trajectory of motion B of the tooth of the meshing partner gear.

Figure 18:
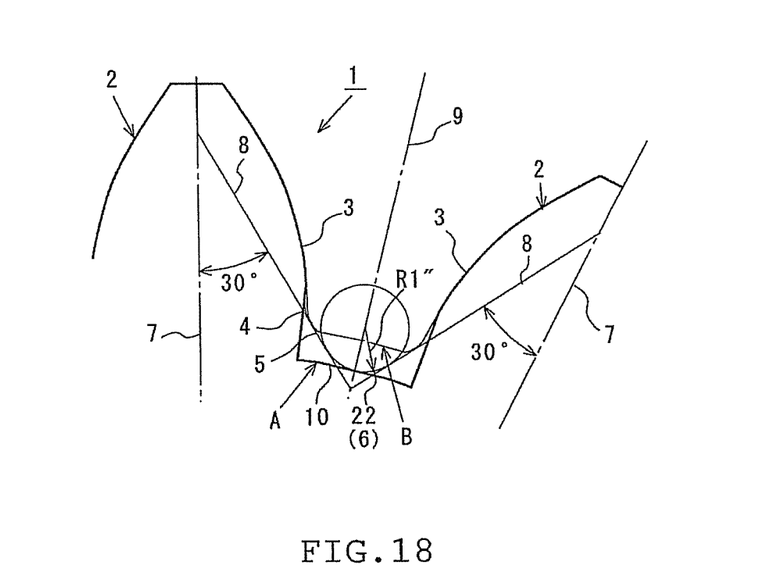
FIG. 18 is a partially enlarged view of a normal plane showing a formation process for a tooth form shape in a fifth variation example according to the first embodiment.

As shown in FIG. 18, an invention according to a sixth aspect relates to a gear 1 having a distinct tooth form shape. In other words, in the invention, (1) a first curved surface 4 smoothly connected to a tooth face 3 of an involute tooth form A and convex in a direction opposite to the tooth face 3, (2) a flat surface 5 connected to the first curved surface 4, and (3) a second curved surface 6 smoothly connected to the flat surface 5 and convex in the same direction as the first curved surface 4 are formed on a tooth root side of a tooth 2. The shape of the flat surface 5 in a normal plane thereof is a tangential line 8 in contact with a tip side end of a trajectory of motion B of a tooth of a meshing partner gear and intersecting with a tooth form center line 7 at a 30° angle when an end of the flat surface 5 on the first curved surface 4 side is extended. The shape of the second curved surface 6 in a normal plane thereof is a circular arc shape formed by a circular arc in contact with a pair of tangential lines 8 and 8 positioned in an opposing manner on both opposing tooth face 3 and 3 sides of adjacent teeth 2 and 2 and a root circle 10 of the involute tooth form A, and having a maximum curvature radius R1" among circular arcs not interfering with the trajectory of motion B of the tooth of the meshing partner gear. The shape of the first curved surface 4 in a normal plane thereof is a circular arc shape in contact with the tooth face 3 and the tangential line 8, and having a maximum curvature radius among circular arcs of a size not interfering with the trajectory of motion B of the tooth of the meshing partner gear.

Effect of the Invention

In a gear of the present invention, stress concentration on the tooth root side including the bottom does not easily occur, and strength of the tooth can be enhanced.

EXPLANATION OF THE REFERENCE NUMERALS

Detailed Description of the Preferred Embodiment

Embodiments of the present invention will be described in detail, below, with reference to the drawings.

First Embodiment

Figure 1:
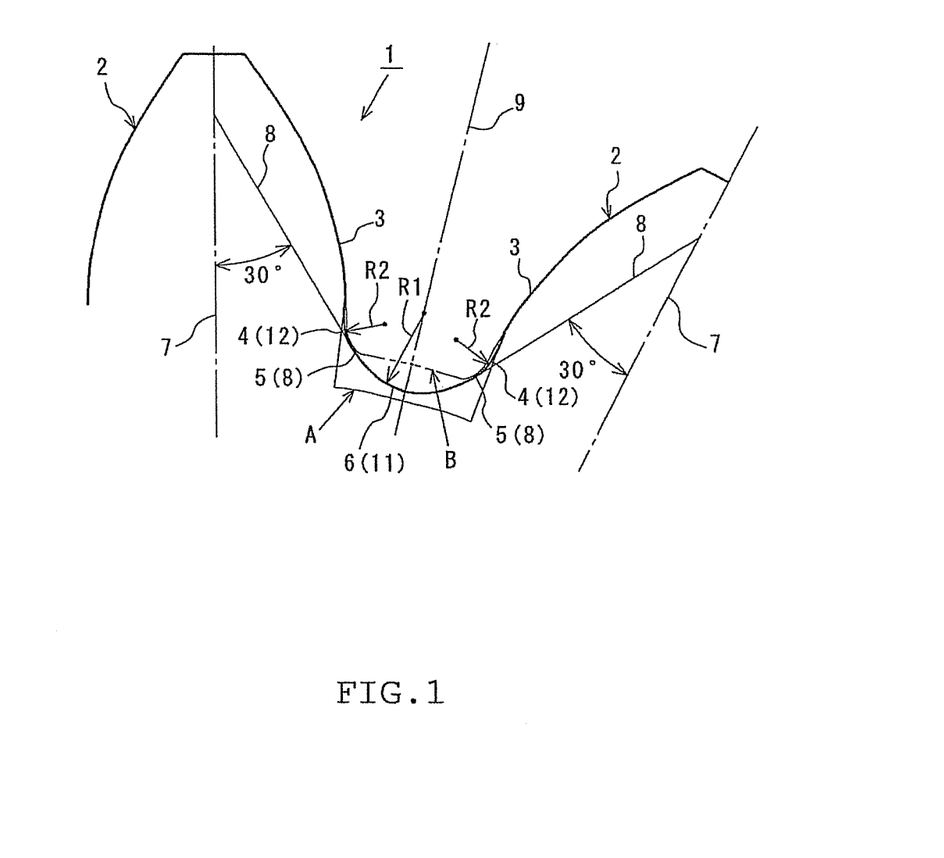
FIG. 1 is an enlarged view of a portion (normal plane) of a tooth of a gear according to a first embodiment of the present invention.

FIG. 1 is an enlarged view of a portion of a tooth 2 of a gear 1 according to a first embodiment of the present invention. According to the first embodiment, the gear 1 is made of a resin material (such as polyamide [PA], polyoxymethylene [POM], polyphenylene sulfide [PPS], or polyphthalamide [PPA]) and is manufactured by injection-molding.

As shown in FIG. 1, in the tooth 2 of the gear 1 according to the first embodiment of the present invention, the shape of an involute tooth form (ordinary tooth form) A on the tooth root side is modified. The involute tooth form A includes a first curved surface 4 connected to a tooth face 3 of the involute tooth form A, a flat surface 5 that extends from the end section of the first curved surface 4, and a second curved surface 6 that is smoothly connected to the end section of the flat surface 5 and smoothly connected to the end section of a flat surface 5 of another adjacent tooth 2. The tooth form shape is determined in the following manner.

Figure 2:
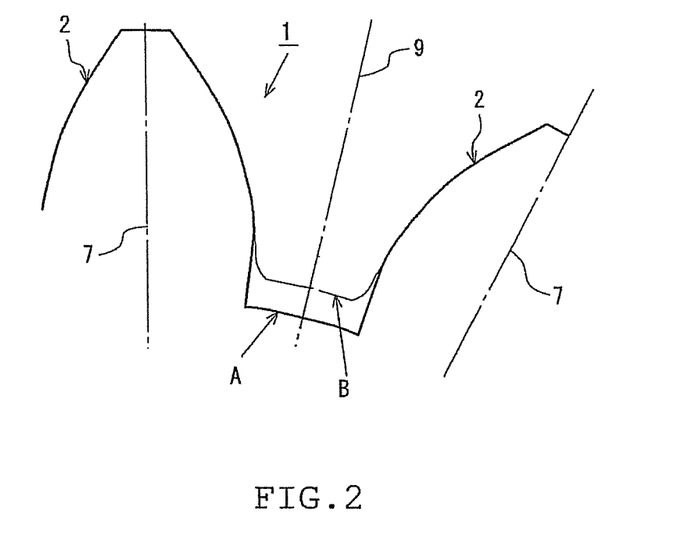
FIG. 2 is a diagram showing a relationship between a tooth having an involute shape and a trajectory of motion B of a tooth of a partner gear meshing therewith.
Figure 3:
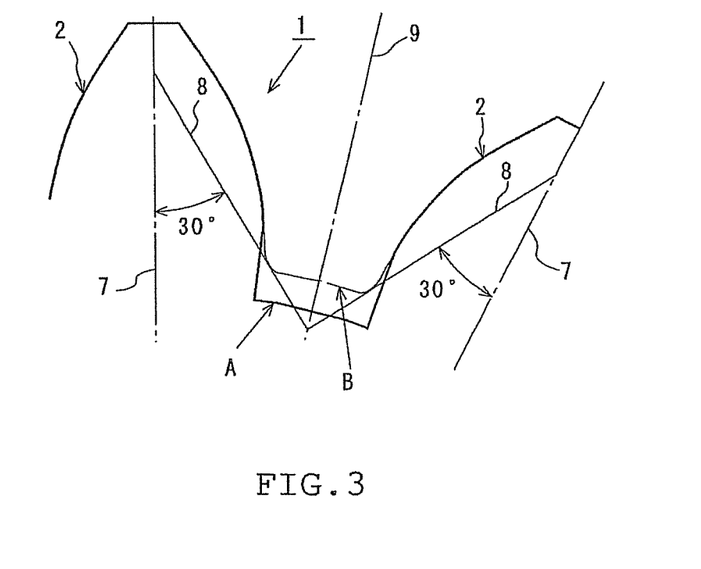
FIG. 3 is a normal plane view showing a first formation process for a tooth form shape according to the first embodiment.

First, 30° tangential lines 8 are drawn in the normal plane in FIG. 2 (see FIG. 3). The 30° tangential lines 8 are respectively in contact with the tip side ends of a trajectory of motion B of a tooth of a partner gear meshing with the involute tooth form A and intersect with a tooth form center line 7 at a 30° angle. A portion of the 30° tangential line 8 in the normal plane of the tooth 2 in FIG. 3 indicates the shape in the normal plane of the flat surface 5 positioned between the first curved surface 4 and the second curved surface 6 (see FIG. 1). In other words, the flat surface 5 is formed such that a virtual flat surface that is an extension of the end section of the flat surface 5 on the first curved surface 4 side intersects with the tooth form center line 7 at a 30° angle. The tooth form center line 7 is a straight line passing through the center of a circular-arc tooth thickness and the center of the gear 1.

Figure 4:
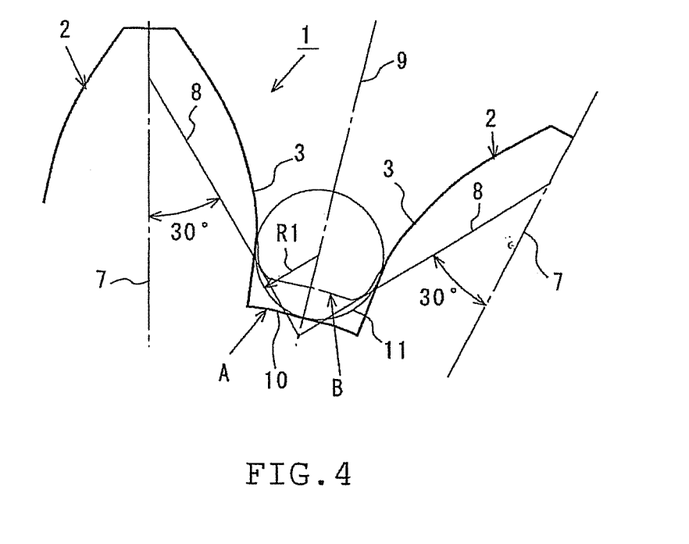
FIG. 4 is a normal plane view showing a second formation process for the tooth form shape according to the first embodiment.

Next, in the normal plane in FIG. 4, a circular arc (a circular arc that is convex in the direction from the tooth top to the tooth root and convex in a direction opposite to the tooth face 3) is determined that has a maximum curvature radius R1 among circular arcs in contact with a root circle 10 of the involute tooth form A and the tooth face 3 of one of either adjacent teeth 2 and 2, and not interfering with the trajectory of motion B of the tooth of the meshing partner gear. For convenience, the circular arc is a bottom R11.

Figure 5:
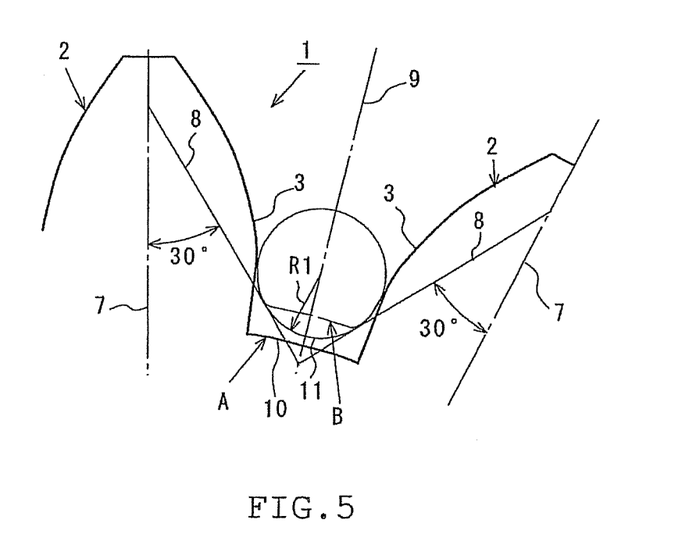
FIG. 5 is a normal plane view showing a third formation process for the tooth form shape according to the first embodiment.

Next, in the normal plane in FIG. 5, a bottom R11 that is in contact with the 30° tangential line is drawn by the bottom R11 being lifted along a tooth space center line 9 to a position coming into contact with the 30° tangential line. At this time, when the bottom R11 does not interfere with the trajectory of motion B of the tooth of the meshing partner gear, the bottom R11 is the shape of the second curved surface 6 in the normal plane. The tooth space center line 9 is a straight line passing through the center of the width of the tooth space and the center of the gear 1.

Figure 6:
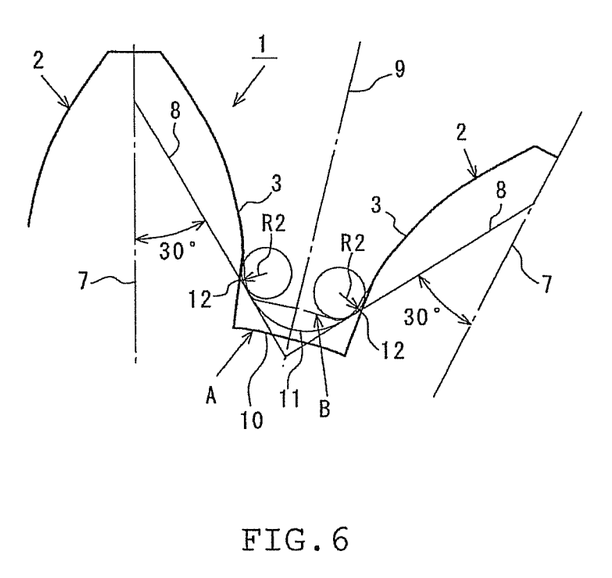
FIG. 6 is a normal plane view showing a fourth formation process for the tooth form shape according to the first embodiment.

Next, as shown in the normal plane in FIG. 6, a circular arc is determined that is convex in the direction opposite to the tooth face 3, in contact with the tooth face 3 of the involute tooth form A and the 30° tangential line 8, and has a maximum curvature radius R2 among circular arcs not interfering with the trajectory of motion B of the tooth of the meshing partner gear. The circular arc having the curvature radius R2 smoothly connects the tooth face 3 and the 30° tangential line 8. For convenience, the circular arc having the curvature radius R2 is a tooth face R12. The tooth face R12 is the shape of the first curved surface 4 in the normal plane. As a result, the tooth form shape of the tooth 2 as shown in FIG. 1 is completed.

Maximum values of tooth root stress in the gear having the tooth form shape according to the first embodiment, formed as described above (referred to, hereinafter, as the gear of the present invention), and a gear having an ordinary tooth form (referred to, hereinafter, as an ordinary gear) were determined by simulation tests 1 and 2. The results are shown in Tables 1 and 2 below.

TABLE 1

|   | Maximum value of stress (MPa) |
| --- | --- |
| Ordinary gear (first example) | 9.5 |
| Gear of the present invention (first example) | 6.9 |

The first simulation test shown in Table 1, above, was conducted using ANSYS, a general-purpose finite element analysis software. In the simulation test, the gear of the present invention (first example) and the ordinary gear (first example) are both spur gears having a module (m) of 1, a stress angle of 20°, and 13 teeth. In the gear of the present invention (first example), the bottom R is 0.45 mm and the tooth face R is 0.3 mm. On the other hand, in the ordinary gear (first example), the bottom R (tooth root side R) is 0.45 mm. A partner gear (first example) meshing with the gear of the present invention (first example) and the ordinary gear (first example) is a spur gear having a module (m) of 1, a stress angle of 20°, and 57 teeth. The tooth top R is zero. The gears are set such that a driving torque of 0.175 Nm is applied to a load point when the meshing between the tooth of the gear of the present invention (first example) or the ordinary gear (first example) and the tooth of the partner gear (first example) changes from two tooth-pair meshing to single tooth pair-meshing (referred to hereinafter as a worst load point).

In the first simulation test, as shown in Table 1, the maximum value of tooth root stress in the ordinary gear (first example) is 9.5 MPa, whereas the maximum value of tooth root stress in the gear of the present invention (first example) is 6.9 MPa. In other words, the maximum value of tooth root stress can be reduced by about 27 in the gear of the present invention (first example), compared to that of the ordinary gear (first example).

TABLE 2

|   | Maximum value of tooth root stress (MPa) |
| --- | --- |
| Ordinary gear (second example) | 29.3 |
| Gear of the present invention (second example) | 26.8 |

Like the first simulation test, the second simulation test shown in Table 2 was conducted using ANSYS, a general-purpose finite element analysis software. In the second simulation test, the gear of the present invention (second example) and the ordinary gear (second example) are both spur gears having a module (m) of 1, a stress angle of 20°, and 30 teeth. In the gear of the present invention (second example), the bottom R is 0.53 mm and the tooth face R is 0.4 mm. On the other hand, in the ordinary gear (second example), the bottom R (tooth root side R) is 0.53 mm. A partner gear (second example) meshing with the gear of the present invention (second example) and the ordinary gear (second example) is a spur gear having a module (m) of 1, a stress angle of 20°, and 30 teeth. The tooth top R is 0.2 mm. The gears are set such that a driving torque of 2 Nm is applied to the worst load point of the meshing between the tooth of the gear of the present invention (second example) or the ordinary gear (second example) and the tooth of the partner gear (second example).

In the second simulation test, as shown in Table 2, the maximum value of tooth root stress in the ordinary gear (second example) is 29.3 MPa, whereas the maximum value of tooth root stress in the gear of the present invention (second example) is 26.8 MPa. In other words, the maximum value of tooth root stress can be reduced by about 9 in the gear of the present invention (second example), compared to that of the ordinary gear (second example).

As described above, as is clear from the above-described results of the simulation tests, the maximum value of tooth root stress in the gear 1 according to the first embodiment can be reduced compared to that of the ordinary gear, and tooth strength can be increased from that of the ordinary gear.

Because the shape of the gear 1 according to the first embodiment on the tooth root side including the bottom is changed to become smooth, stress is less likely to be concentrated on the tooth root side including the bottom, compared to the conventional gear 100 in which the bottom shape is a peaked triangle (see FIG. 19).

First Variation Example According to First Embodiment

According to the above-described first embodiment, when the bottom R11 is moved to the position in contact with the 30° tangential line 8 and the bottom R11 interferes with the trajectory of motion B of the tooth of the meshing partner gear as shown in FIG. 7, a bottom R13 having a maximum curvature radius Ra (a curvature radius Ra that is smaller than the curvature radius R1 of the bottom R11 [R1>Ra]) among circular arcs in contact with the 30° tangential line 8 and not interfering with the trajectory of motion B of the tooth of the partner gear is redrawn between the trajectory of motion B of the tooth of the meshing partner gear and the root circle 10 of the involute tooth form A (see FIG. 8). The bottom R13 is the shape of the second curved surface 6 in the normal plane (see FIG. 1).

As shown in FIG. 9, a curvature radius Rb of a tooth face R14 indicating the shape of the first curved surface 4 in the normal plane is a curvature radius of a largest circular arc among circular arcs that are in contact with the tooth face 3 and the 30° tangential line, and of a size not interfering with the trajectory of motion B of the tooth of the meshing partner gear (see FIG. 1).

The gear 1 having the tooth form shape in the first variation example according to the first embodiment achieves similar effects as those of the gear 1 according to the first embodiment.

Second Variation Example According to First Embodiment

Figure 10:
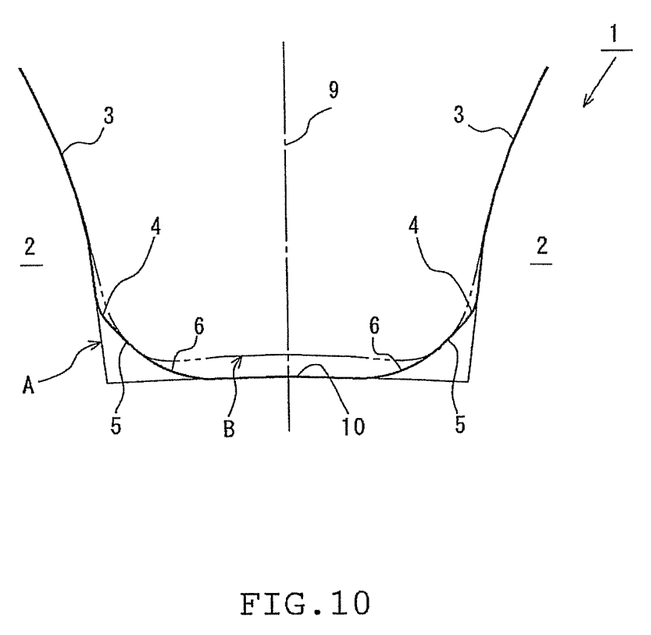
FIG. 10 is an enlarged view of a portion (normal plane) of a tooth of a gear in a second variation example according to the first embodiment.
Figure 11:
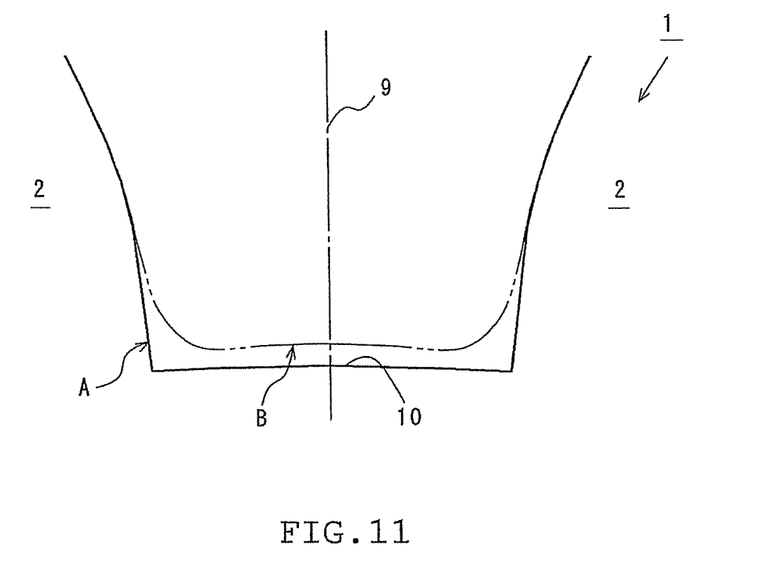
FIG. 11 is a diagram (normal plane view) showing a relationship between the tooth of the gear in the second variation example according to the first embodiment and a trajectory of motion of a tooth of a partner gear meshing therewith.

FIG. 10 shows a tooth form shape of the gear 1 in a second variation example according to the first embodiment. As shown in FIG. 11, the second variation example applies to a gear 1 used such that the trajectory of motion B of the tooth of the partner gear meshing with the tooth 2 having the involute tooth form (ordinary tooth form) A is closer to the root circle 10 of the tooth 2 having the involute tooth form A than that according to the above-described first embodiment.

As shown in FIG. 10, the shape of the involute tooth form A on the tooth root side of the tooth 2 of the gear 1 in the second variation example is modified. The tooth form A includes the first curved surface 4 connected to the tooth face 3 of the involute tooth form A, a flat surface 5 that extends from an end section of the first curved surface 4, and a second curved surface 6 smoothly connected to an end section of the flat surface 5 and smoothly connected to a root circle 15. The tooth form shape is determined in a following manner.

Figure 12:
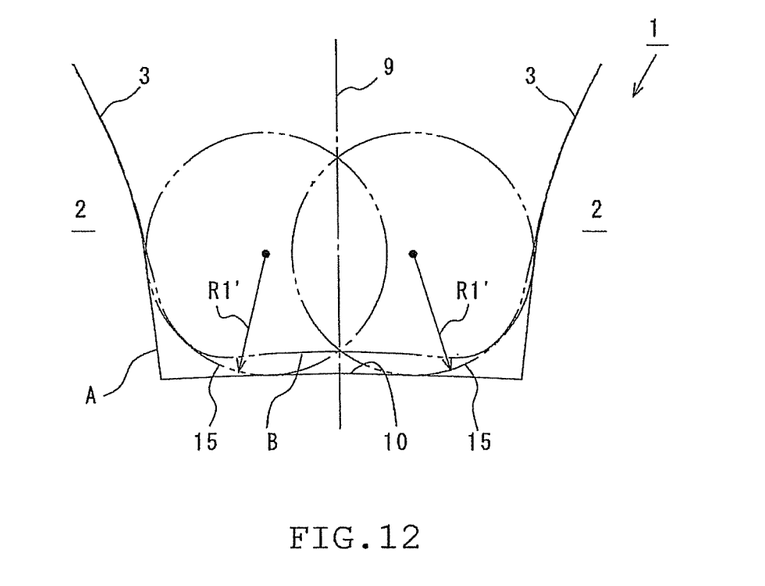
FIG. 12 is a partially enlarged view of a normal plane showing a first formation process for a tooth form shape in the second variation example according to the first embodiment.

First, in a first formation process for the tooth form shape shown in FIG. 12, a circular arc (a circular arc that is convex in the same direction as a tip side end of the trajectory of motion B of the meshing partner gear and convex in the direction from the tooth top towards the tooth root) 15 is determined that has a maximum curvature radius R1' among circular arcs in contact with the root circle 10 of the gear 1 and the tooth face 3 of any of the adjacent teeth 2 and 2, and not interfering with a tip side end of the trajectory of motion B of the tooth of the partner gear meshing with the tooth 2 having the involute tooth form A.

Figure 13:
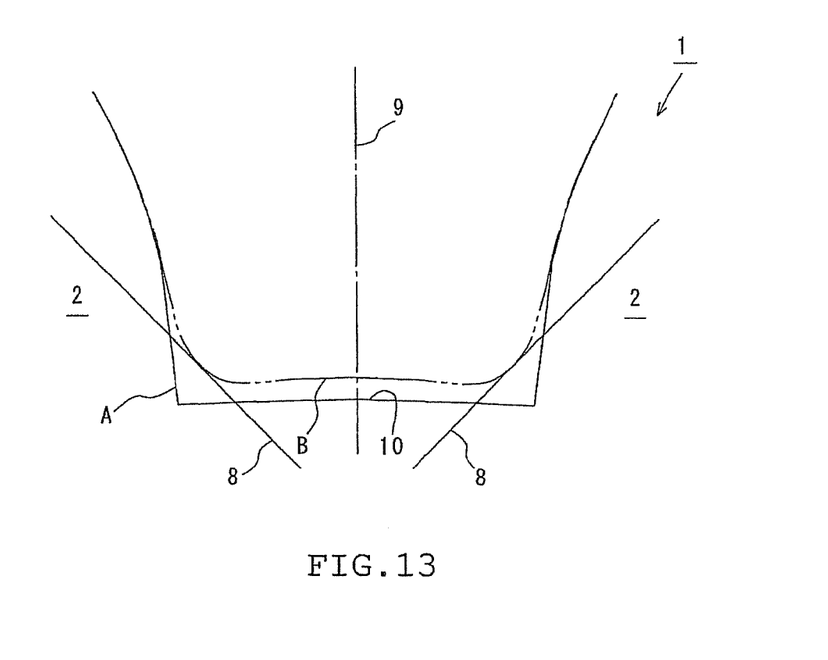
FIG. 13 is a partially enlarged view of a normal plane showing a second formation process for the tooth form shape in the second variation example according to the first embodiment.

Next, in a second formation process for the tooth form shape shown in FIG. 13, the 30° tangential lines 8 respectively in contact with the tip side ends of the trajectory of motion B of the tooth of the partner gear meshing with the tooth 2 having the involute tooth form A and intersecting the tooth form center line 7 at a 30° angle are drawn (see FIG. 1).

Figure 14:
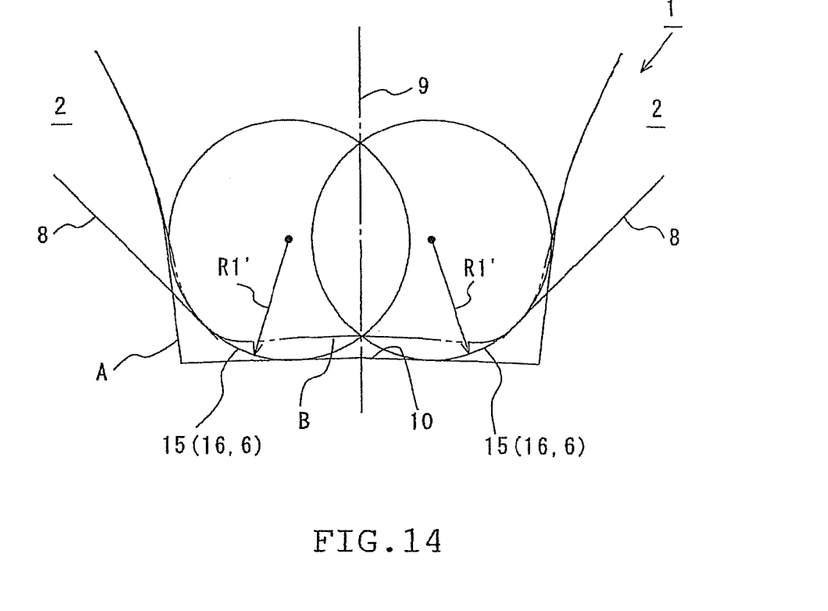
FIG. 14 is a partially enlarged view of a normal plane showing a third formation process for the tooth form shape in the second variation example according to the first embodiment.

Next, in a third formation process for the tooth form shape shown in FIG. 14, the circular arc 15 having the curvature radius R1' determined in the first formation process in FIG. 12 is drawn (moved) such as to be in contact with the 30° tangential line 8 and the root circle 10. Here, when the circular arc 15 having the curvature radius R1' does not interfere with the trajectory of motion B of the meshing partner gear, the circular arc having the curvature radius R1' is a bottom R16 (see FIG. 14). The bottom R16 is the shape of the second curved surface 6 in the normal plane.

Figure 15:
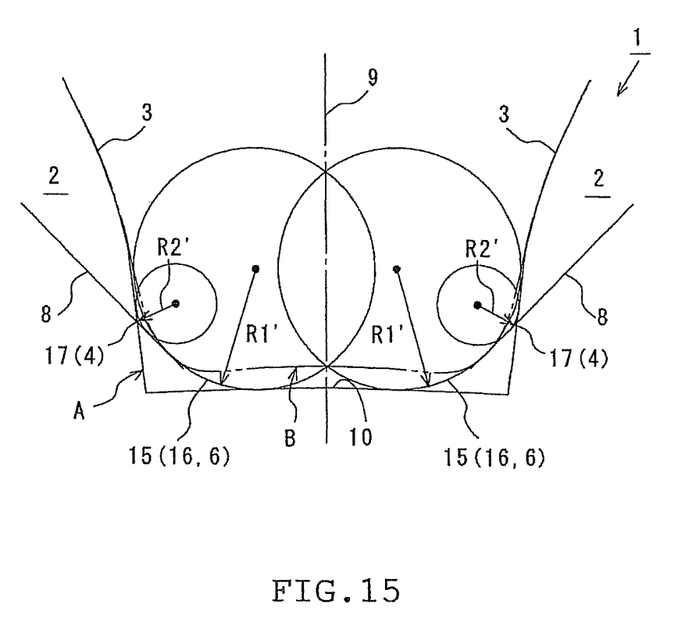
FIG. 15 is a partially enlarged view of a normal plane showing a fourth formation process for the tooth form shape in the second variation example according to the first embodiment.

Next, in a fourth formation process for the tooth form shape shown in FIG. 15, the tooth face 3 of the involute tooth form A and the 30° tangential line 8 are smoothly connected by a circular arc that is convex in the direction opposite to the tooth face 3 and has a maximum curvature radius R2' among circular arcs that are of a size not interfering with the trajectory of motion B of the meshing partner gear. Here, the circular arc having the curvature radius R2' is a tooth face R17. The tooth face R17 is the shape of the first curved surface 4 in the normal plane.

In addition, in the fourth formation process for the tooth form shape shown in FIG. 15, a portion of the 30° tangential line 8 between a position in contact with the tooth face R17 and a position in contact with the bottom R16 is the shape of the flat surface 5 in the normal plane. As a result, the tooth form shape of the tooth 2 as shown in FIG. 10 is completed.

The gear 1 having the tooth form shape in the second variation example achieves similar effects as those of the gear 1 according to the first embodiment.

Third Variation Example According to First Embodiment

In the third formation process for the tooth form shape shown in FIG. 14, when the circular arc 15 having the curvature radius R1' interferes with the trajectory of motion B of the meshing partner gear, a circular arc is determined that has a maximum curvature radius Rx (where Rx [not shown in FIG. 14] is a curvature radius smaller than the curvature radius R1' [Rx<R1']) among circular arcs in contact with the 30° tangential line 8 and the root circle 10, and not interfering with the trajectory of motion B of the meshing partner gear. The circular arc is the bottom R16. The bottom R16 is the shape of the second curved surface 6 on the normal plane.

The gear 1 having the tooth form shape in the third variation example achieves similar effects as those of the gear 1 according to the first embodiment.

Fourth Variation Example According to First Embodiment

FIG. 16 and FIG. 17 show a fourth example according to the first embodiment. Some of the formation processes for the tooth form shape in the second variation example according to the first embodiment are changed.

In other words, in the fourth variation example, the first formation process for the tooth form shape shown in FIG. 12 in the second variation example is omitted, and the second formation process for the tooth form shape shown in FIG. 13 is performed as a first formation process for the tooth form shape in the fourth variation example.

Next, in a second formation process for the tooth form shape in the fourth variation example shown in FIG. 16, a circular arc is determined that has a maximum curvature radius R1a among circular arcs in contact with the root circle 10 and the 30° tangential line 8, and not interfering with the trajectory of motion B of the meshing partner gear. The circular arc is a bottom R20. The bottom R20 is the shape of the second curved surface 6 in the normal plane.

Next, in a third formation process for the tooth form shape in the fourth variation example shown in FIG. 17, the tooth face 3 of the involute tooth form (ordinary tooth form) A and the 30° tangential line 8 are smoothly connected by a circular arc that is convex in the direction opposite to the tooth face 3 and has a maximum curvature radius R2a among circular arcs of a size not interfering with the trajectory of motion B of the tooth of the meshing partner gear. Here, the circular arc having the curvature radius R2a is a tooth face R21. The tooth face R21 is the shape of the first curved surface 4 in the normal plane.

In addition, in the third formation process for the tooth form shape in the fourth variation example shown in FIG. 17, a portion of the 30° tangential line 8 from a position in contact with the tooth face R21 to a position in contact with the bottom R20 is the shape of the flat surface 5 in the normal plane.

The gear 1 having the tooth form shape in the fourth variation example achieves similar effects as those of the gear 1 according to the first embodiment.

Fifth Variation Example According to First Embodiment

FIG. 18 shows a formation process for a tooth form shape in a fifth variation example according to the first embodiment. A variation example of the tooth form shape of the gear 1 according to the above-described first embodiment is shown.

In other words, in the fifth variation example, after the 30° tangential line 8 shown in FIG. 3 is drawn, instead of the circular arc having the curvature radius R1 shown in FIG. 4, as shown in FIG. 18, a circular arc is determined that has a maximum curvature radius R1" (R1>R1") among circular arcs in contact with a pair of 30° tangential lines 8 and 8 positioned in an opposing manner and the root circle 10, and not interfering with the trajectory of motion B of the tooth of the meshing partner gear. The circular arc having the curvature radius R1" is a bottom R22. The bottom R22 is the shape of the second curved surface 6 in the normal plane.

The tooth face R is determined in a manner similar to that according to the first embodiment shown in FIG. 6.

In the fifth variation example such as this, effects similar to those according to the first embodiment can be achieved without changing the diameter of the root circle 10 of the involute tooth form A (without changing the whole depth of the tooth 2 having the involute tooth form A). The whole depth of the gear 1 according to the first embodiment is formed to be less than that in the fifth variation example. When the tooth bottom R is a circular arc having a curvature radius smaller than that of the bottom R22 determined in the fifth variation example (a curvature radius smaller than the curvature radius R1"), a tooth can be formed having a greater whole depth than the whole depth of the tooth 2 in the fifth variation example without changing the outer dimensions of the gear 1.

Sixth Variation Example According to First Embodiment

In FIG. 4 showing the second formation process for the tooth form shape according to the first embodiment, the bottom R11 can be in contact with both opposing tooth faces 3 and 3 of the adjacent teeth 2 and 2 of the gear 1.

INDUSTRIAL APPLICABILITY

The tooth form shape of the gear of the present invention can be widely applied as the tooth form shape of a spur gear, a helical gear, a double-helical gear, a face gear, a bevel gear, a worm gear, a hypoid gear, and the like.

The tooth form shape of the gear of the present invention is not limited to a gear made of a resin material, and can be applied to gears made of metal (such as alloy steels for machine structural use, carbon steel, stainless steel, free-cutting steel, brass, and phosphor bronze) and the like.

What is claimed is:
1. A gear, wherein
(1) a first curved surface smoothly connected to a tooth face of an involute tooth form and convex in a direction opposite to the tooth face, (2) a flat surface connected to the first curved surface, and (3) a second curved surface smoothly connected to the flat surface and convex in the same direction as the first curved surface are formed on a tooth root side of a tooth,
the shape of the flat surface in a normal plane thereof is a tangent in contact with a tip side end of a trajectory of motion of a tooth of a meshing partner gear and intersecting with a tooth form center line at a 30° angle when an end of the flat surface on the first curved surface side is extended,
the shape of the second curved surface in a normal plane thereof is a circular arc shape in contact with the tangent and having a maximum curvature radius among circular arcs not interfering with the trajectory of motion of the tooth of the meshing partner gear, and
the shape of the first curved surface in a normal plane thereof is a circular arc shape in contact with the tooth face and the tangent, and having a maximum curvature radius among circular arcs not interfering with the trajectory of motion of the tooth of the meshing partner gear.
2. A gear, wherein
(1) a first curved surface smoothly connected to a tooth face of an involute tooth form and convex in a direction opposite to the tooth face, (2) a flat surface connected to the first curved surface, and (3) a second curved surface smoothly connected to the flat surface and convex in the same direction as the first curved surface are formed on a tooth root side of a tooth, the shape of the flat surface in a normal plane thereof is a tangent in contact with a tip side end of a trajectory of motion of a tooth of a meshing partner gear and intersecting with a tooth form center line at a 30° angle when an end of the flat surface on the first curved surface side is extended, the shape of the second curved surface in a normal plane thereof is a circular arc shape formed by a circular arc in contact with both opposing tooth faces of adjacent teeth and a root circle of the involute tooth form, and having a maximum curvature radius among circular arcs not interfering with the trajectory of motion of the tooth of the meshing partner gear, the circular arc being moved along a tooth space center line to a position in contact with the tangent, and the shape of the first curved surface in a normal plane thereof is a circular arc shape in contact with the tooth face and the tangent, and having a maximum curvature radius among circular arcs not interfering with the trajectory of motion of the tooth of the meshing partner gear.

3. A gear, wherein (1) a first curved surface smoothly connected to a tooth face of an involute tooth form and convex in a direction opposite to the tooth face, (2) a flat surface connected to the first curved surface, and (3) a second curved surface smoothly connected to the flat surface and convex in the same direction as the first curved surface are formed on a tooth root side of a tooth, the shape of the flat surface in a normal plane thereof is a tangent in contact with a tip side end of a trajectory of motion of a tooth of a meshing partner gear and intersecting with a tooth form center line at a 30° angle when an end of the flat surface on the first curved surface side is extended, the shape of the second curved surface in a normal plane thereof is a circular arc shape formed by a circular arc in contact with the tooth face and a root circle of the involute tooth form, and having a maximum curvature radius among circular arcs not interfering with the trajectory of motion of the tooth of the meshing partner gear, the circular arc being moved to a position in contact with the tangent and the root circle, and the shape of the first curved surface in a normal plane thereof is a circular arc shape in contact with the tooth face and the tangent, and having a maximum curvature radius among circular arcs of a size not interfering with the trajectory of motion of the tooth of the meshing partner gear.

4. A gear, wherein (1) a first curved surface smoothly connected to a tooth face of an involute tooth form and convex in a direction opposite to the tooth face, (2) a flat surface connected to the first curved surface, and (3) a second curved surface smoothly connected to the flat surface and convex in the same direction as the first curved surface are formed on a tooth root side of a tooth, the shape of the flat surface in a normal plane thereof is a tangent in contact with a tip side end of a trajectory of motion of a tooth of a meshing partner gear and intersecting with a tooth form center line at a 30° angle when an end of the flat surface on the first curved surface side is extended, the shape of the second curved surface in a normal plane thereof is a circular arc shape in contact with the tangent and a root circle of the -involute tooth form, and having a maximum curvature radius among circular arcs not interfering with the trajectory of motion of the tooth of the meshing partner gear, and the shape of the first curved surface in a normal plane thereof is a circular arc shape in contact with the tooth face and the tangent, and having a maximum curvature radius among circular arcs of a size not interfering with the trajectory of motion of the tooth of the meshing partner gear.

5. A gear, wherein (1) a first curved surface smoothly connected to a tooth face of an involute tooth form and convex in a direction opposite to the tooth face, (2) a flat surface connected to the first curved surface, and (3) a second curved surface smoothly connected to the flat surface and convex in the same direction as the first curved surface are formed on a tooth root side of a tooth, the shape of the flat surface in a normal plane thereof is a tangent in contact with a tip side end of a trajectory of motion of a tooth of a meshing partner gear and intersecting with a tooth form center line at a 30° angle when an end of the flat surface on the first curved surface side is extended, the shape of the second curved surface in a normal plane thereof is a circular arc shape formed by a circular arc in contact with a pair of tangents positioned in an opposing manner on both opposing tooth face sides of adjacent teeth and a root circle of the involute tooth form, and having a maximum curvature radius among circular arcs not interfering with the trajectory of motion of the tooth of the meshing partner gear, and the shape of the first curved surface in a normal plane thereof is a circular arc shape in contact with the tooth face and the tangent, and having a maximum curvature radius among circular arcs of a size not interfering with the trajectory of motion of the tooth of the meshing partner gear.

* * * * *